May 22, 1956

R. L. EMERY 2,746,358

PULP MOLDING APPARATUS

Filed Jan. 21, 1952

RICHARD L. EMERY
INVENTOR.

BY
HIS ATTORNEY

May 22, 1956 — R. L. EMERY — 2,746,358
PULP MOLDING APPARATUS
Filed Jan. 21, 1952 — 8 Sheets-Sheet 3

RICHARD L. EMERY
INVENTOR.

BY *Arthur J. Connolly*
HIS ATTORNEY

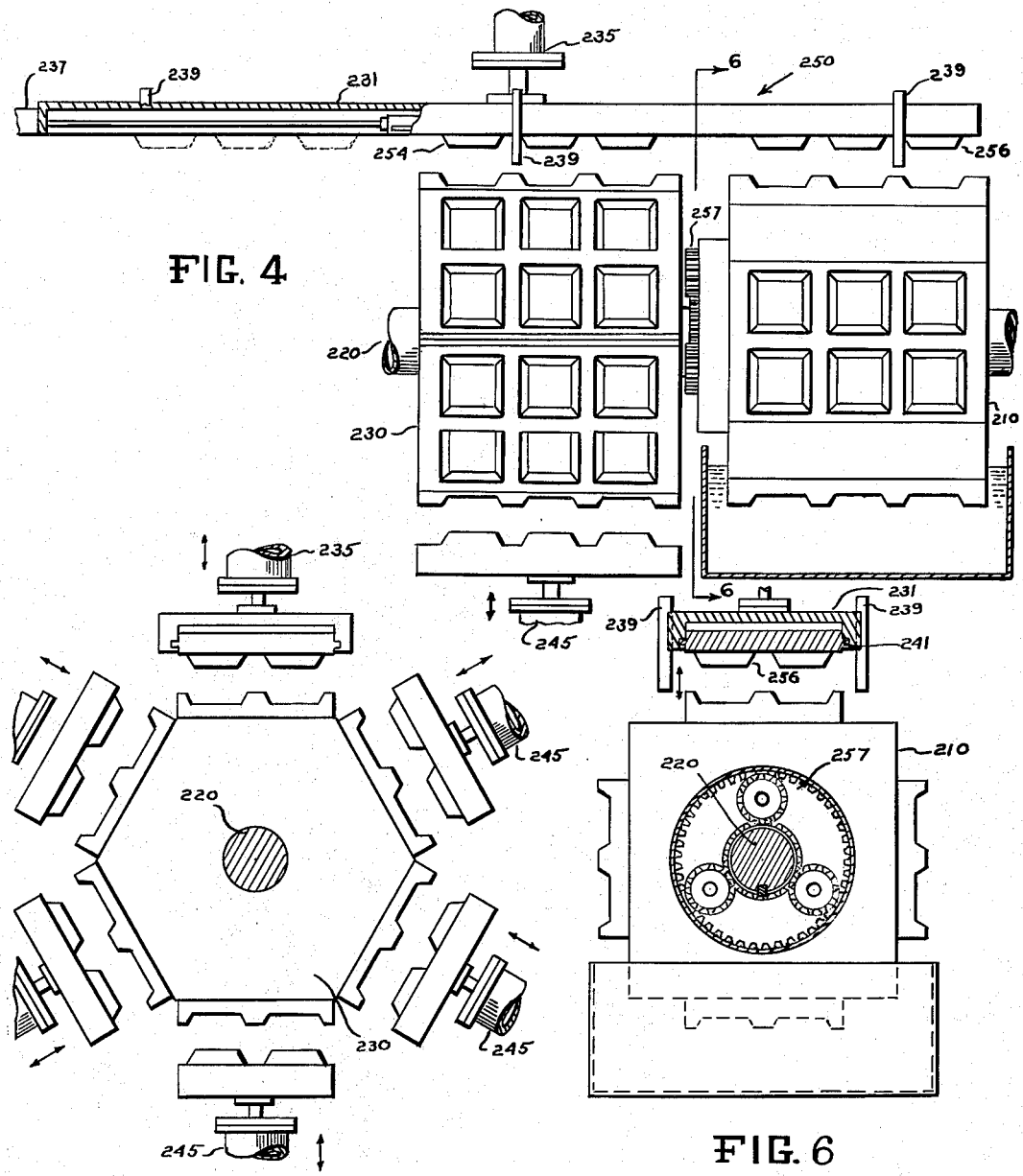

RICHARD L. EMERY
INVENTOR.

BY
HIS ATTORNEY

May 22, 1956

R. L. EMERY 2,746,358

PULP MOLDING APPARATUS

Filed Jan. 21, 1952

RICHARD L. EMERY
INVENTOR.

May 22, 1956 R. L. EMERY 2,746,358
PULP MOLDING APPARATUS
Filed Jan. 21, 1952 8 Sheets-Sheet 7

RICHARD L. EMERY
INVENTOR.

BY
HIS ATTORNEY

May 22, 1956  R. L. EMERY  2,746,358
PULP MOLDING APPARATUS
Filed Jan. 21, 1952  8 Sheets-Sheet 8

RICHARD L. EMERY
INVENTOR.

BY
HIS ATTORNEY

United States Patent Office 2,746,358
Patented May 22, 1956

2,746,358

PULP MOLDING APPARATUS

Richard L. Emery, Fairfield, Maine, assignor to Keyes Fibre Company, Portland, Maine, a corporation of Maine Application January 21, 1952, Serial No. 267,423

6 Claims. (Cl. 92—56)

The present invention relates to pulp molding apparatus and particularly to that type of apparatus having a turret assembly of forming dies and another turret assembly of pressing and/or drying dies.

Among the objects of the present invention is the provision of novel pulp molding apparatus having a considerably simplified form.

The above as well as further objects of this invention will be more fully understood from the following description of several of its exemplifications, reference being made to the accompanying drawings wherein:

Fig. 4 is a view similar to Fig. 1 of a further modified embodiment of the present invention;

Fig. 5 is a side view similar to Fig. 2 of the apparatus of Fig. 4;

Fig. 6 is a sectional view of the apparatus of Fig. 4 taken along line 6—6;

According to the present invention a turreted assembly of forming dies and a turreted assembly of pressing and/or drying dies are both rotatably mounted on the same shaft to thereby greatly reduce the number and complexity of structural members required to support the various components, particularly the more bulky of these components.

Figure 1:
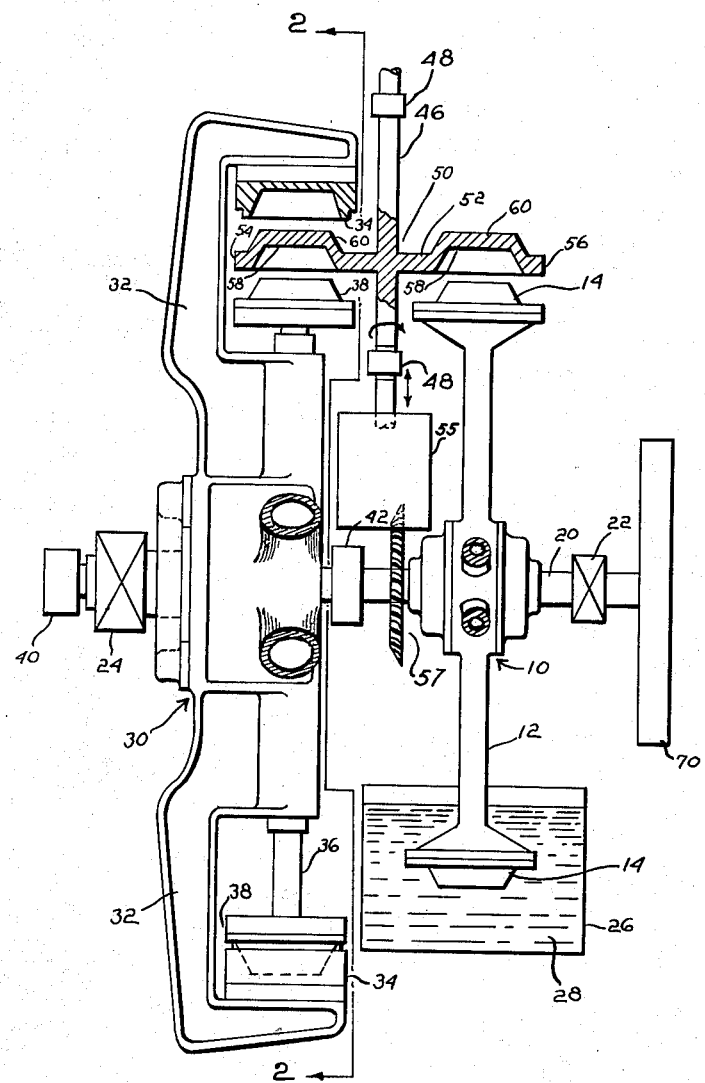
Fig. 1 is an approximately vertical sectional view of the essential elements of one form of pulp molding apparatus embodying the present invention.
Figure 2:
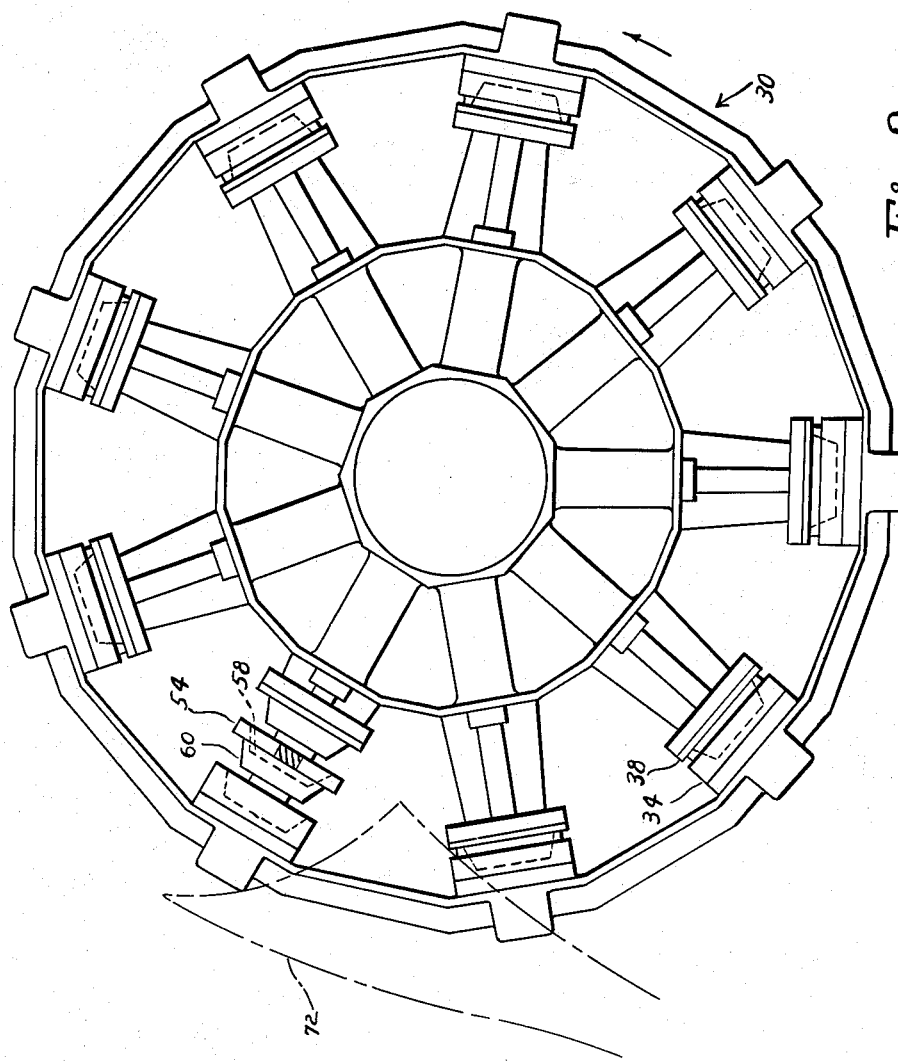
Fig. 2 is a sectional view of the apparatus of Fig. 1 taken along the line 2—2.

Referring to the construction of Figs. 1 and 2, there is here shown a forming turret 10 having a plurality of radially disposed arms 12 each holding a pulp forming die 14 and the entire assembly mounted for rotation on shaft 20 suitably supported as indicated at 22 and 24. Below the forming turret is a forming trough 26 in which a quantity of a pulp slurry 28 is contained, and the forming dies in rotation around the axis of shaft 20 are arranged to pass through the slurry. By the use of suitably applied suction, as through conduits in the turret arms 12 connected in a conventional manner, liquid from the pulp slurry will be sucked through the immersed forming dies causing a layer of pulp to deposit on the porous forming surface of these dies, as is well known. The details of the forming turret construction form no part of the present invention and any convenient arrangement can be used, as for example that shown in the Chaplin Patent No. 2,163,585, granted June 27, 1939.

Alongside forming turret 10 on shaft 20 is a pressing or drying turret 30 having a plurality of radially disposed clamping brackets 32 each holding an inwardly facing pressing or drying die 34. In addition a corresponding set of retractable arms 36 are arranged to hold outwardly facing dies 38, each having a pressing surface that mates with the pressing surfaces of dies 34. The arms 36 can be operated as by a centrally disposed cam, or by hydraulic pressure supplied through a hydraulic coupling as indicated at 40, to be moved outwardly for pressing the mating dies together as the pressing turret rotates, and to be retracted during a portion of the rotation as indicated more clearly in Fig. 2. Either or both of the pairs of pressing dies can be provided with heating means in addition to suction means so as to assist in violatilizing and driving off liquid in the pulp masses that are compressed between the dies. For this purpose electric heating elements can be provided, or if desired steam heating conduits can be suitably arranged and supplied with steam as by means of the steam junction 42.

Both turrets 10 and 30 are arranged to rotate together around the longitudinal axis of elongated shaft 20 so that layers of wet pulp are disposed on the successive forming dies 14 and carried around to a position adjacent that at which the pressing dies are held open. At this position a transfer mechanism is arranged to carry the formed layers of wet pulp from the forming die to one of the adjacent pressing dies. In the form illustrated in Fig. 1 the transfer mechanism is shown at 50 as including a frame 52 carrying a pair of opposed transfer dies 54, 56. Frame 52 also carries a centrally disposed axle 46 around which it is arranged to rotate as by means of bearings 48, and along which it can also be reciprocated as by slidably fitting the axle within these bearings. For this purpose an axle that is splined, or is squared in transverse section, can be readily fitted as shown for example in the copending W. H. Randall et al. application, Serial No. 251,411 filed October 15, 1951, and operated by similar mechanism contained in housing 55 and driven by gear 57 on shaft 20 for example.

Each of the transfer dies 54, 56 has a lower transfer surface 58 that mates with the surfaces of dies 14 and 38. At the same time the transfer dies also have upper transfer surfaces 60 that mate with the surfaces of pressing dies 34.

In use the apparatus of Figs. 1 and 2 is operated to periodically step the turrets around by amounts corresponding to spacing between successive turret arms. A Geneva movement, as shown in the above Randall et al. application, actuating an indexing wheel 70 is effective for this purpose.

Between advance steps, the transfer frame 52 is translated downwardly until the lower transfer surfaces 58 engage the appropriate die surfaces 38, 14. At this point the formed mass of wet pulp on die 14 is transferred to the transfer die 56, as by suitably timed interruption of the suction on the formed die along with the application of suction to the transfer die with or without the additional application of compressed air through the forming die. While this transfer is taking place from die 14 to die 56, a previously transferred layer of pulp which is now on lower surface 58 of transfer die 54, is deposited on the lower pressing die 38. As in the other transfer, suction and/or compressed air can also be used here.

When the transfer and deposit of the above pulp layers have been completed, the transfer frame 52 is translated upwardly until upper surface 60 of die 54 engages the open pressing die 34. At this point a pulp article which has completed the pressing cycle through turret 30, and is arranged to adhere to the outer dies 34 when the pairs of dies separate, is dropped or blown onto the upper transfer surface 60. At the same time, a pressed article previously applied to the upper surface 60 of die 56 can be unloaded as by blowing it off into a suitably disposed discharge chute 72. The transfer frame 52 is then returned to the neutral position shown in Fig. 1. The transfer frame is now ready for rotation 180° around axle 46, thereby interchanging the positions of transfer dies 54, 56.

During this rotary step of the transfer mechanism, the turrets are also stepped to the next position. The drive mechanism of the turrets and the transfer frame can be interconnected by gear 57 so that no special timing is needed and simultaneous stepping is automatically obtained.

The number of arms on each turret 10, 30 is subject to wide variation. Although nine such arms are shown, as little as four and as much as thirty or more can be used if desired. The number of transfer dies on transfer frame 50 can also be increased if desired, but in these variations the rotary steps of the transfer frame will have to be correspondingly adjusted to assure proper transfer.

The tilting of the transfer surfaces 60 makes for more accurate unloading of the pressed articles from these transfer surfaces. As shown in Fig. 2 for example, such mounting is effected with a transfer die tilted from the horizontal by an amount which causes pressed articles to be positively dropped downwardly in a predetermined direction when blown from the upper transfer surface 60. This unloading can be further guided as by providing suitably positioned baffle members against which the blown articles are propelled and from which they are deflected in the desired direction. Such baffles can also be used with horizontally located unloading surfaces, but with somewhat less desirable discharge accuracy.

The turrets 10, 30 are optionally either fixed on their pivot shaft 20 for simultaneous rotation with this shaft, or the shaft can be non-rotatably fixed in place and the turrets journalled with respect to the shaft so that they turn around it.

Figure 3:
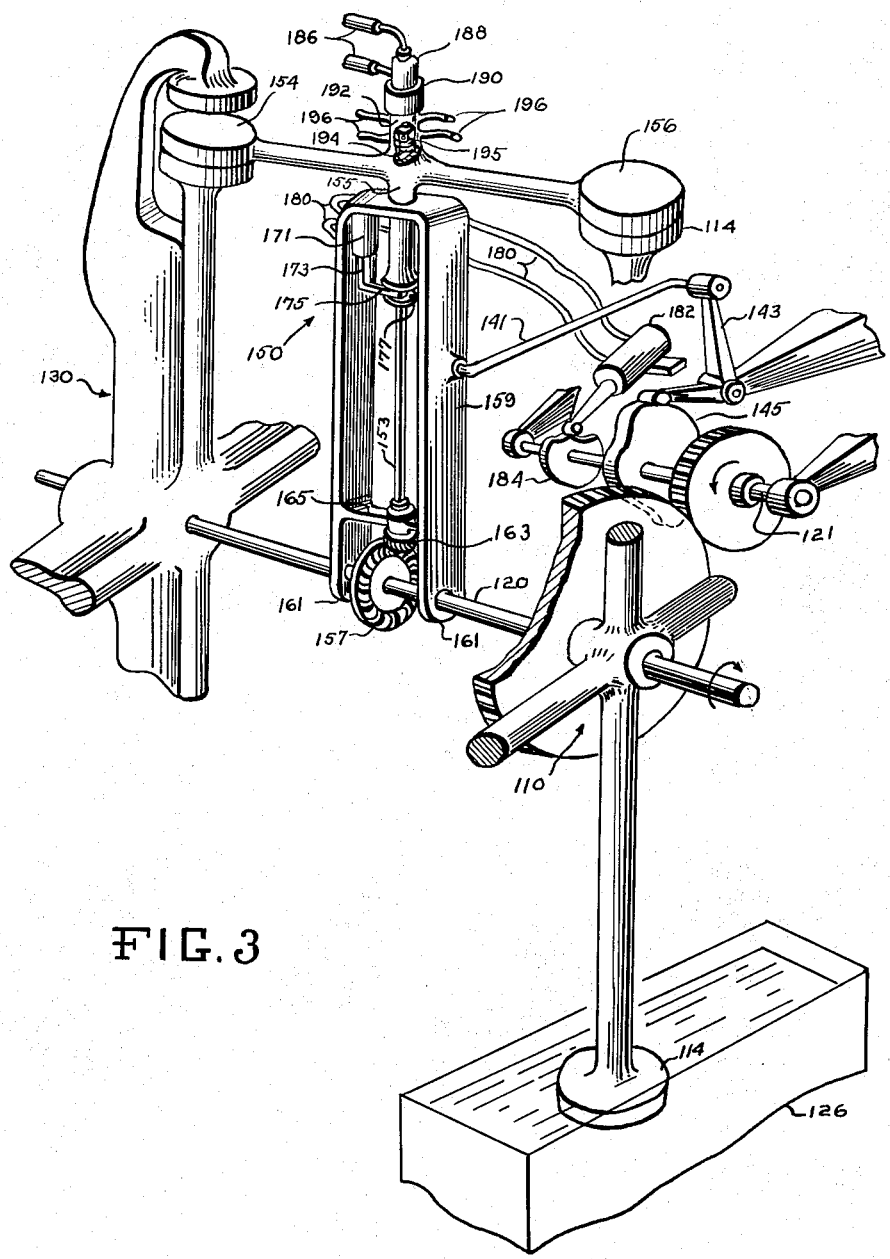
Fig. 3 is a diagrammatic isometric view of a different form of molding apparatus exemplifying the present invention.

Fig. 3 shows a machine generally similar to that of Fig. 1, but arranged for the forming and pressing turrets to operate in a non-intermittent manner. The forming turret is here schematically indicated at 110 as having four arms arranged to continuously rotate on shaft 120 to carry forming dies 114 held on the individual arms, through a forming tank 126. A pressing and drying turret 130 also rotates on the shaft 120 and is generally similar to the corresponding pressing turret 30 of Fig. 1.

Between the turrets 110 and 130 is a transfer assembly 150 having a set of transfer dies 154, 156 carried by tube 155 which is in turn slidably fitted on guide rod 153 as by making the rod 153 and the internal bore of tube 155 square in transverse section. The tube 155 is also rotatably and slidably received in a housing 159 which is rotatably held on shaft 120, as by bearing arms 161. Fixed to the guide rod 153 is a pinion gear 163 that meshes with a ring gear 157 keyed to shaft 120. The pinion gear is kept meshed with the ring gear by a bearing engagement with an internal wall 165 of the housing. This also holds the guide rod 153 against longitudinal shifting.

An oscillating link connected to the housing is arranged for actuation to oscillate the housing along an arc about the shaft 120. During that half of the oscillation in which the housing is rotating in the same direction as the shaft, the housing speed is arranged to exactly equal that of the shaft so that as to each other they remain in fixed relation. In addition, the transfer dies are arranged to move in exactly aligned position with respect to the forming and pressing dies during this portion of the oscillation. For the remainder of the oscillation, the housing speed can be of any value. During the return half of the oscillation, the meshing gears 157, 163 cause the transfer dies to rotate around guide rod 153 by an amount sufficient to interchange the positions of these dies. As shown, these operations are effected by a bell crank 143 actuated by a cam 145 and driving the housing through linkage 141 to provide one complete oscillation each time a forming die moves past. A cam shaft 121, driven by main shaft 120 at a rotational speed corresponding to the total number of forming dies multiplied by the rotational speed of shaft 120, conveniently provides the oscillation cycles. However, an oscillating cam directly driven by shaft 120 and having a cam surface giving the desired multiplicity of oscillations per cycle can also be used.

For longitudinally reciprocating the transfer dies, the housing 155 is shown as moved by a pneumatic or hydraulic cylinder 171 conveniently mounted within the housing and having an operating rod 173 connected as by means of a fork 175 with a groove 177 in the external wall of the tube 155. A pair of fluid lines 180 connect the cylinder 171 with a control valve 182 having a valve-shifting bar actuated by a timing cam 184.

In operation the shaft 120 is driven by any convenient mechanism such as an electric motor. The forming and pressing turrets are thereby moved continuously (non-intermittently) around their cycles. As each set of forming and drying dies approaches the transfer mechanism, the drying dies open and the transfer dies are pulled along by link 141 in synchronized mating position. During this synchronized step, the transfer dies 154, 156 are translated inwardly to contact the inner pressing die and the forming die respectively. At this engagement the formed mass of pulp on the forming die is transferred to the transfer die 156, and a previously loaded formed pulp mass on die 154 is deposited on the inner pressing die. The transfer dies are now translated outwardly until die 154 engages the outer pressing die. This enables the pulp articles that have now been through the entire pressing cycle and which are arranged to stay on the outer pressing die when the pressing dies open, to be unloaded onto the upper face of transfer die 154. A previously unloaded article on the upper face of die 156 can at this time be blown or dropped off into a discharge chute or receiver as more completely shown in connection with Figs. 1 and 2.

All the above operations are timed to take place while the transfer assembly is moving along in synchronized relation with the turrets 110, 130, during half the transfer oscillation cycle. In the other half of this cycle, the transfer assembly is pushed back around the shaft 120 in the opposite direction causing the pinion gear 106 to be rotated half a turn by the ring gear 157 and reverse the position of the transfer turrets. The next set of forming and pressing dies has meanwhile reached the position initially occupied by the previous set, and the mechanism goes through another transfer cycle exactly the same as above. These cycles repeat themselves, each causing a freshly formed pulp layer to be lifted from the forming turret, another such layer to be deposited on the pressing turret, a final pressed article to be unloaded onto a transfer die, and another final pressed article to be discharged. If for some reason, however, any of the dies should have its pulp article removed, as for inspection or other purpose, the operation of the entire machine will not be affected except for the fact that no transfers will take place from the vacant die or dies.

To assist in the transfers, the various turrets, including the transfer assembly, can be provided with compressed air and/or vacuum line connections to the individual dies. As shown in Fig. 3, this can conveniently be in the form of a pair of flexible conduits 186 connected to a concentric pipe assembly 188 in which the outer pipe has a standard rotary seal attaching it to a rotatable outer pipe 192 fixed on the transfer die holder 155. The inner pipe of the concentric pipe assembly extends through the seal 190 and terminates in a spool-shaped seal 194, having a central groove 195, closely fitted within the pipe 192 to substantially isolate the groove 195 from the outer pipe. Suitable external pipe connections 196, from the tube and the spool's groove, are connected to the respective transfer dies. The actuation of compressed air and vacuum can be controlled in proper timed relation to the transfers as by means of cams driven from shaft 121 and affecting the supply connections to lines 186. The same type of mechanism can also be used in the apparatus of Figs. 1 and 2.

As an alternate construction the pressing turret of Fig. 3 can have its outer dies retractable and its inner dies relatively fixed at the same distance as the forming dies from the shaft 120. The opening of the pressing dies can then be accomplished by pulling out the outer dies. After the transfer mechanism is moved between the opened dies, the transfer die reciprocation can then be effected either with the transfer assembly mechanism of Fig. 3, or by merely partly returning inwardly the outer pressing die so that it engages the aligned transfer die and then moves this transfer die against the inner pressing die. At these engagements a transfer dies is also carried against a forming die and all the transfer operations are effected. The outer pressing die is then again retracted, the transfer dies rotated, and the apparatus is ready for the next cycle. A reciprocating cylinder 171 and drive connection will not be needed with this form of the invention. Instead the pressing die actuating mechanism is suitably revised to provide the above motion.

If desired a combination of partial pressing die return and transfer die reciprocation can also be used to provide the necessary transfer engagements.

Where the pressing applied by the apparatus of the present invention is accompanied by drying for the purpose of completely drying the wet mass of pulp formed on the forming dies, and the greatest apparatus efficiency is desired, it is advisable to increase the ratio of pressing time to forming time.

Figs. 4, 5 and 6 show in somewhat schematic form one embodiment of the invention for accomplishing the above. Here a forming turret 210 and a drying turret 230, though mounted on the same shaft 220, are provided with different numbers of dies and are rotated at different speeds. As shown (Fig. 6) the forming turret has only four die stations while the drying turret has six. One of the turrets can be directly keyed to the shaft 220, and reduction gears shown as a planetary gearing 257 used to interconnect the turrets and rotate the unkeyed one around the shaft. However, both turrets can, if desired, be arranged to rotate with respect to the shaft. In the illustrated form, the turrets are intermittently driven, the forming turret moving in steps of one-fourth of a turn, while the drying turret simultaneously moves in steps of one-sixth turn. After each step, a transfer assembly 250 approaches to bring sets of transfer dies 254, 256 into engagement with the aligned outwardly facing forming and drying dies. In this operation the die 256 picks up a wet formed layer of pulp from the aligned forming turret die while the die 254 picks up a dried article from the exposed drying turret die. The transfer dies, which are shown are slidably held as a unit in a framework 231, are then lifted away and slid over to bring the transfer die 256 over the drying turret and the transfer die 254 over a discharge receiver not shown. The transfer dies are then again brought toward the turrets, this time carrying only die 256 into engagement with the drying turret 230 and effecting transfer of the previously loaded wet formed pulp onto the emptied drying die. At any time while die 254 is in the shifted position shown in dash lines in Fig. 4, it is arranged to drop or blow off the dried article previously taken from the drying turret. Another transfer die withdrawal followed by a return shift of the transfer dies back into position facing both turrets, as shown in Fig. 4, completes the cycle. The turrets can now be stepped around once more, and the transfer cycle repeated.

In the illustrated embodiment, the transfer dies are operated by fluid-actuated cylinders 235, 237, one of which raises and lowers the entire die-carrying framework 231 along vertically directed rails 239, and the other of which slides the transfer dies to and fro along the framework guided by flanges 241 that project from the sides of the dies and are received in corresponding grooves in the framework.

Although the drying turret in the construction of Fig. 4 can have outer dies that rotate with and remain pressed against it except at the transfer position, in a manner similar to that shown in Figs. 1 and 2, the outer pressing dies can also be of the intermittently operated type, each fixed with respect to turret rotation, but slidable toward and away from the turret as by the fluid cylinders 245 shown in Fig. 5. The drying and pressing steps at each drying die station can then take place during the stationary turret dwell in the successive transfer cycles, as described in the Randall et al. Patent No. 2,234,979, granted March 18, 1941.

As also shown in Figs. 4, 5 and 6, the turret dies need not be of the individual type, one at each turret station, but can be in the form of a multiplicity of the same or different dies at each station. This feature is also very effectively used in the construction of Figs. 1, 2 and 3.

The number of die stations in the forming and drying turrets of Figs. 4, 5 and 6 can be varied to suit the particular conditions. Where the turret stepping time is relatively short compared to the stationary dwell between steps, the apparatus of Fig. 4 provides a drying and pressing time approximately five times as long as the forming time. Where different time ratios are desired, correspondingly different numbers of dies and variations of stepping cycles can be used.

Figure 7:
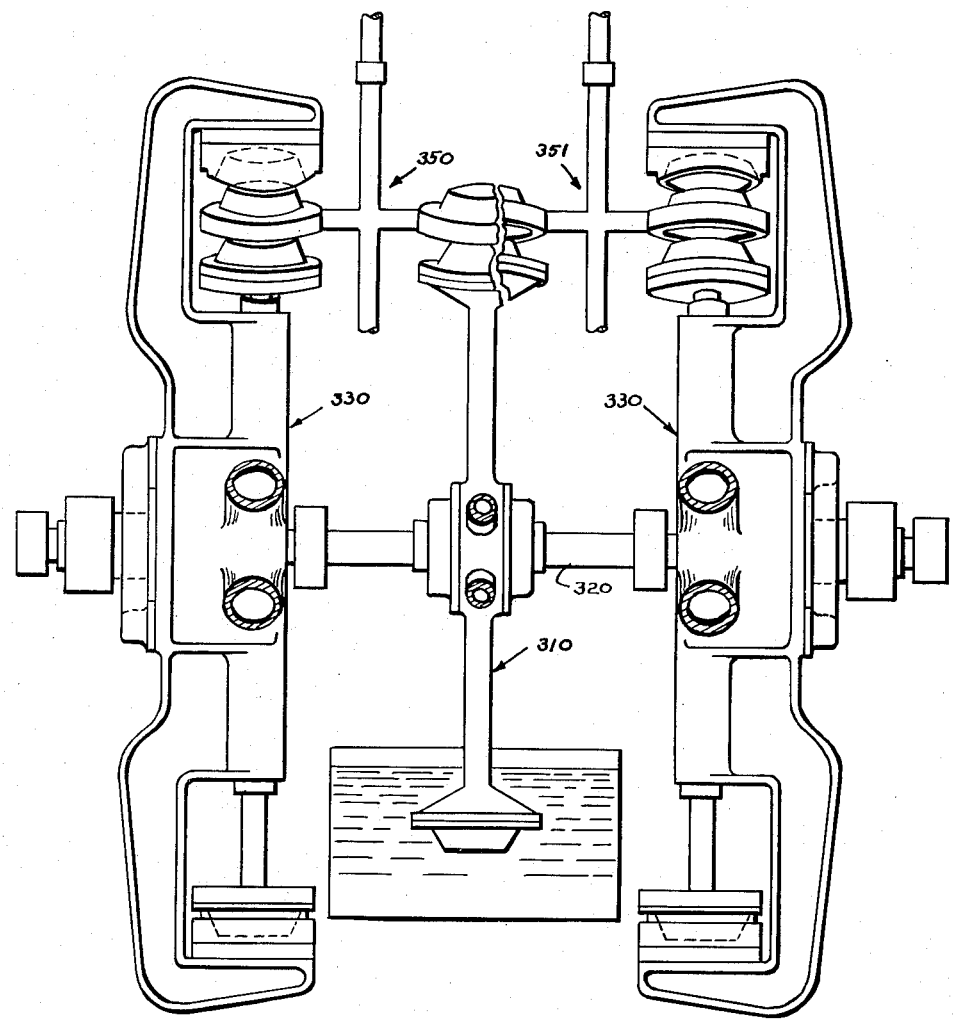
Fig. 7 is a view similar to Fig. 1 of a still further modification of the molding apparatus incorporating the present invention.
Figure 8:
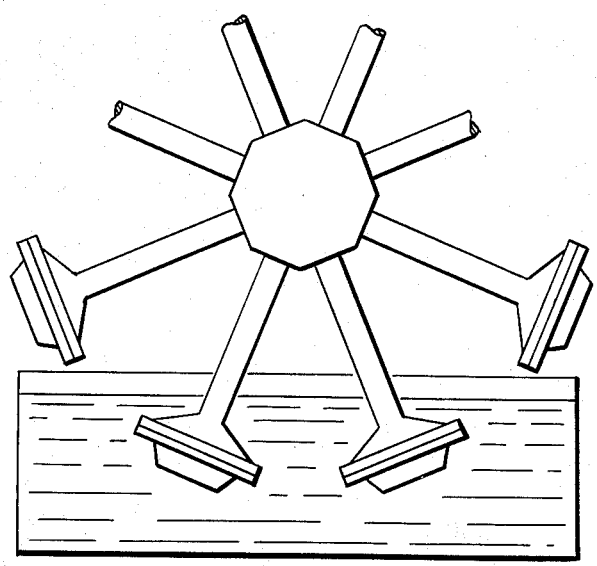
Fig. 8 is a detail side view of the apparatus of Fig. 7 showing the pulp formation portion of the assembly.

Instead of changing the relative number of die stations per turret, the pressing time can also be increased with respect to the forming time, by providing more than one pressing turret for each forming turret. Figs. 7 and 8 show such an apparatus.

Here a forming turret 310 generally similar to the forming turret of Fig. 1 is flanked on each side by a drying and pressing turret 330, also similar to the pressing turret of Fig. 1. All three turrets are mounted on a common shaft 320 but the forming turret is geared up to rotate two stations at each step, while the drying turrets both rotate one station per step. Two sets of transfer assemblies are shown at 350, 351, each similar to the assembly 50 in the construction of Fig. 1 but displaced around the periphery of the forming turret so that they do not interfere with each other.

As shown in Fig. 8 it is advantageous to actuate the turrets in such fashion that two forming dies are immersed in the forming tank in the dwell between successive steps. Corresponding pairs of formed articles can be simultaneously transferred to the separate drying turrets at each step so that each transferred article is subject to substantially identical formation and drainage before it is transferred. However, this feature is not essential since appreciable variations in drainage time and some variation in forming time can be tolerated. An odd or even number of die stations can be used per turret.

The present invention can also be used when making molded pulp articles of laminated construction. Thus, for example, where a molded pulp plate is desired to have a special purpose surfacing liner, as to provide exceptional moisture resistance for baking purposes, the liner can be made of a suitable stock such as one that is highly hydrated or contains a substantial resin content, while the body of the plate can be of less expensive stock. One form of apparatus for this purpose is shown in fragmentary view in Fig. 9.

In this construction two forming turrets 410, 411 are combined with a single pressing turret for simultaneous rotation on a common shaft 420. Separate transfer assemblies 450, 451 are used, one to transfer a formed pulp layer from turret 410 to a pulp layer already formed on turret 411, and the other to transfer the superimposed layers together to the drying turret and also unload the drying turret. Forming turret 410 is arranged to form the body of the plate, while forming turret 411 forms the liner. The transfer assemblies are offset around the periphery of turret 411, as in the construction of Fig. 7, to keep them from interfering with each other. When the wet body and wet liner are superimposed and pressed together in turret 430 until substantially dry, they show practically no tendency to delaminate.

Attention is called to the fact that in this construction, transfer turret 450 need only reciprocate through one step toward and away from the forming turrets, between successive turret steps. At each such reciprocation, a layer is picked up from turret 410, and a previously picked up layer is deposited on turret 411. During the turrret stepping this transfer assembly rotates around its central shaft so that at the completion of the turret stepping another reciprocation will effect an additional transfer. Transfer assembly 451 must, however, go through the double reciprocation between successive turret steps, as explained in connection with Fig. 1, or one or both of the open pressing turret dies can be also partially reciprocated to simplify the transfer assembly reciprocation.

Figure 9:
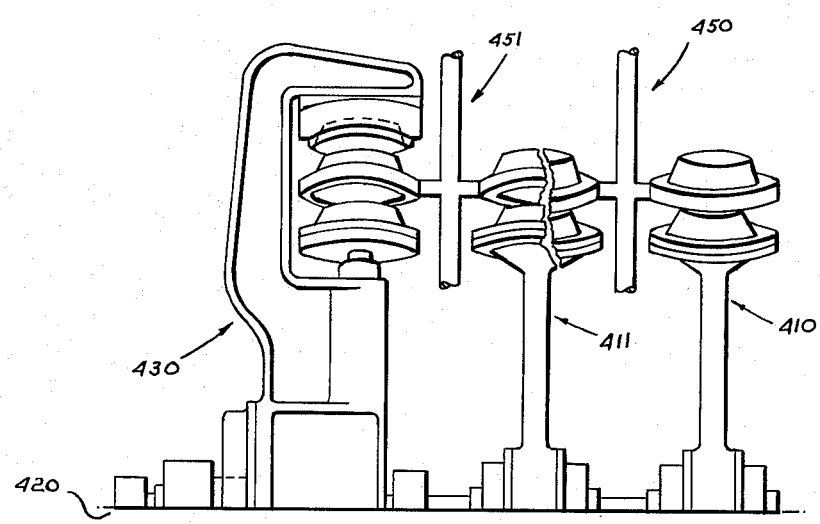
Figs. 9 and 10 are views similar to Fig. 1 of additional examples of the apparatus of the present invention.
Figure 10:
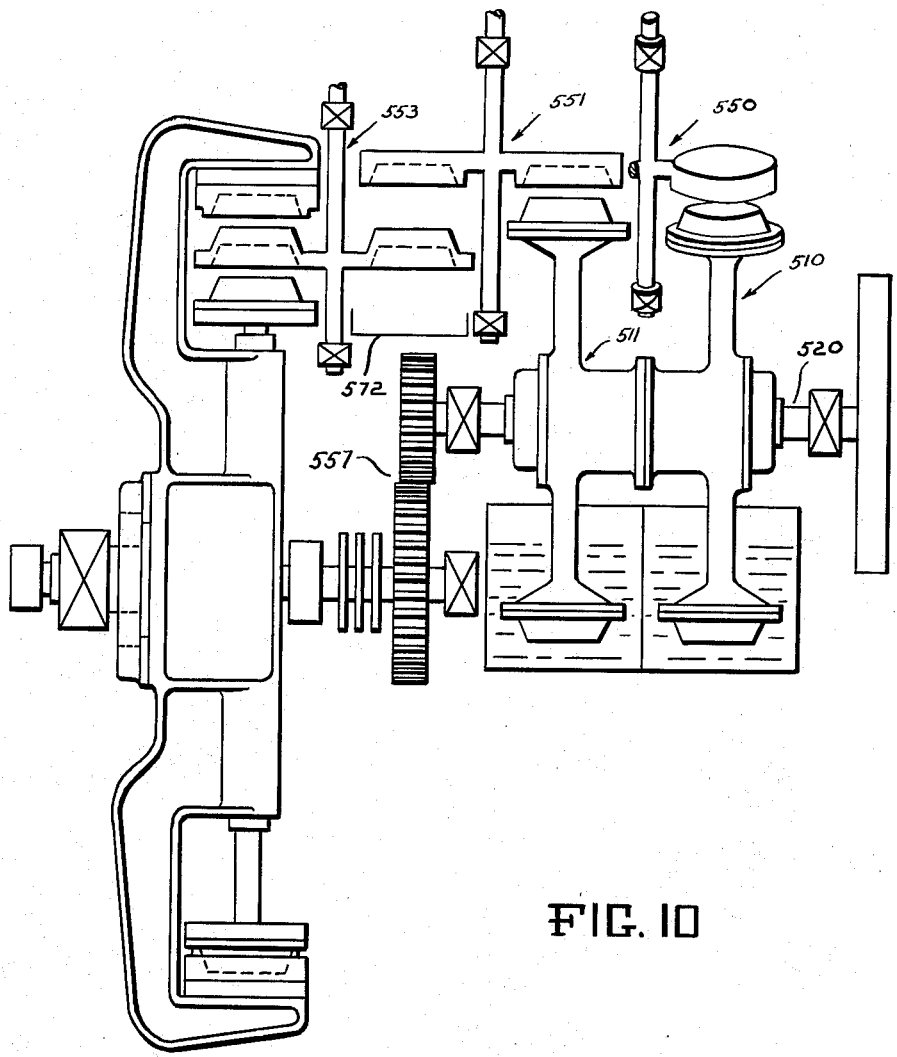
Figure 11:
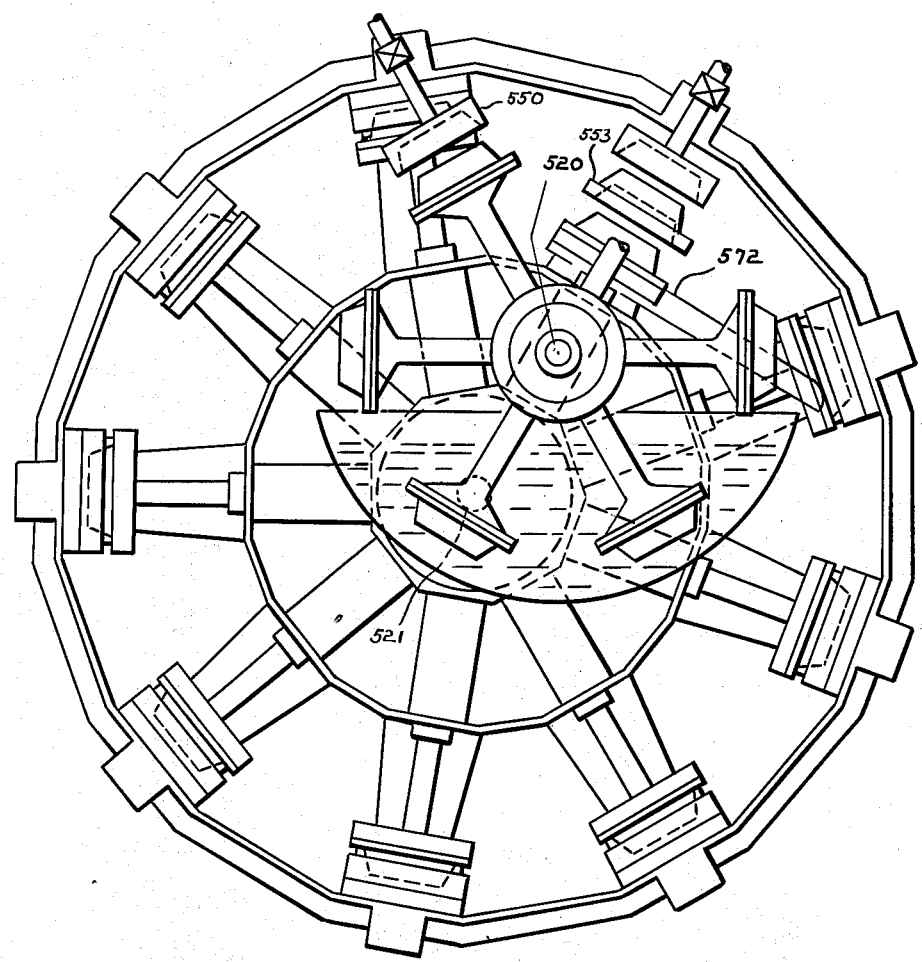
Fig. 11 is a side view of the apparatus of Fig. 10.

Figs. 10 and 11 show a modified apparatus for making laminated molded pulp articles and using different numbers of pressing and forming die stations in accordance with the present invention. Here two forming turrets 510, 511 are used in the manner shown in the apparatus of Fig. 9, with a transfer assembly 550 to lift the pulp layer formed on turret 510 to the layer formed on turret 511. A second transfer assembly 551 removes the pair of superimposed layers from the turret 511, but instead of depositing them directly on the pressing turret die, transfers them there by way of an additional transfer assembly 553.

All the dies of transfer assemblies 550, 551 can have die faces on only those surfaces facing the turrets, as in the transfer assembly 450 of Fig. 9. The assembly 553, however, is shown as having die faces on both this inner surface as well as its opposite or outer surface. Assembly 551 accordingly deposits the combined pulp layers on an outer die face of assembly 553, which in turn transfers it to one of the outer pressing dies. At the same time the inner die faces of assembly 553 unload pressed articles from the inner pressing dies and drop them into a discharge receiver shown as a chute 572.

In the construction of Fig. 10, the transfer assemblies are conveniently operated by having them all rotate in steps along with the turrets, and having assemblies 550 and 551 reciprocate toward and away from the turrets while assembly 553 first moves outwardly into engagement with the outer pressing turret die and the lowered die of assembly 551. At this position the superimposed layers carried by the contacted die of transfer assembly 551 are transferred to one of the upper die faces of the assembly 553 and a previously transferred layer sandwich is loaded on an outer pressing die. The assembly 553 is then brought down to its innermost position where it picks up a pressed article from an inner pressing die and discharges a previously picked up article into the chute 572. The assembly 553 is then returned to an intermediate position where it does not interfere with the rotation of the pressing turret. After the next turret step, the transfer cycle repeats itself.

As indicated in Fig. 11, the forming turrets have fewer die stations than the pressing turret, the former having six and the latter nine. Other ratios can also be used, however. In the illustrated construction the forming turrets are mounted on one shaft 520 while the pressing turret is mounted on another shaft 521. Suitable gearing interconnects these shafts to properly synchronize the turret rotation indexing.

The number of dies carried by any of the transfer assemblies in the above constructions need not be limited to two, but can be increased to any desired number that can be radially mounted to fit within the available space.

As many apparently widely different embodiments of this invention may be made without departing from the spirit and scope hereof, it is to be understood that the invention is not limited to the specific embodiments hereof, except as defined in the appended claims.

What is claimed is:

1. In a pulp molding apparatus, an open container for holding a body of pulp slurry from which articles are to be molded, a forming turret unit positioned adjacent said container, said turrent unit comprising a hub mounted for rotation, and a plurality of forming dies radially extending from said hub, said turret unit being so positioned relative to said container that, as said turret unit rotates each of the dies thereon are successively carried into, through and out of the slurry in said container, a drying turret unit coaxial with said forming turret unit, said drying turret unit also being mounted for rotation, said drying turret unit comprising a hub, a plurality of inner drying dies connected to said hub and positioned radially in respect to said hub, and a plurality of outer drying dies also connected to said hub and positioned radially thereto, there being an outer die corresponding to each of said inner dies, each of said outer dies being positioned radially outwardly of its corresponding inner die, said drying turret unit being so constructed and arranged that each inner die and its corresponding outer die are relatively movable into and out of compressive relationship, driving mechanism for rotating both of said turret units in timed relationship, means for causing each inner die and its corresponding outer die to be relatively moved into compressive relationship during at least one portion of the rotational movement of said drying turret unit and out of such compressive relationship at other portions of said rotational movement, and transfer mechanism operatively connected to both of said turret units and adapted to transfer formed masses of molded pulp from each of the dies on said forming turret unit to a position between a pair of corresponding inner and outer dies on said drying turret unit when said last mentioned inner and outer dies are out of compressive relationship, said transfer mechanism being also adapted to unload molded articles from the drying dies after the completion of a drying treatment.

2. The apparatus of claim 1 in which one turret unit is fixed to a driven shaft, the other turret unit is rotatably journalled around said shaft and the driving mechanism interconnects the two turrets for simultaneous rotation at different rates.

3. The apparatus of claim 1 in which the transfer mechanism includes a pair of transfer dies held on opposite sides of a transfer frame and separated by a distance equal to the distance between correspondingly positioned dies on the respective turrets, and means for shifting the frame to first move a transfer die into mating relation with a forming die and then into mating relation with a corresponding inner and outer pressing die to effect the transfer to the pressing dies of a pulp mass formed on the forming die.

4. The apparatus of claim 3 in which the means for shifting the frame is adapted to move the corresponding inner and outer pressing dies out of compressive relationship during a portion of the pressing turret rotation, the transfer dies each have opposed transfer surfaces mating with the respective pressing dies of each pair, and said means for shifting the frame being also adapted to momentarily bring the transfer surfaces into engagement with the corresponding inner and outer pressing dies to load one of the pressing dies and unload the other pressing die.

5. The apparatus of claim 4 in which the transfer dies are adapted to be brought into transfer engagement with the sides of the turrets to receive pressed articles on an inclined transfer surface from which the article can be accurately blown off into a discharge chute.

6. The apparatus of claim 1 in which the driving mechanism is connected for continuously rotating the turrets in non-intermittent manner, and the transfer mechanism is connected to oscillate to and fro and to move at the same speed as the dies when on that portion of its oscillation in which it moves in the die rotation direction.

References Cited in the file of this patent

UNITED STATES PATENTS

| | | |
|---|---|---|
| Re. 19,856 | Chapman | Feb. 18, 1936 |
| 1,377,342 | Harbrecht | May 10, 1921 |
| 1,788,944 | Chaplin | Jan. 13, 1931 |
| 1,809,852 | Jay | June 16, 1931 |
| 1,845,830 | Chaplin | Feb. 16, 1932 |
| 1,983,324 | Swift | Dec. 4, 1934 |
| 2,307,022 | Chaplin | Jan. 5, 1943 |
| 2,346,608 | Randall | Apr. 11, 1944 |
| 2,388,828 | Chaplin | Nov. 13, 1945 |
| 2,494,743 | Chaplin | Jan. 17, 1950 |

FOREIGN PATENTS

| | | |
|---|---|---|
| 444,398 | Germany | May 23, 1927 |